United States Patent
Chiang

(10) Patent No.: US 9,772,937 B2
(45) Date of Patent: Sep. 26, 2017

(54) DATA PROCESSING METHOD, MEMORY CONTROLLER AND MEMORY STORAGE APPARATUS

(71) Applicant: PHISON ELECTRONICS CORP., Miaoli (TW)

(72) Inventor: Hsu-Chih Chiang, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 295 days.

(21) Appl. No.: 13/845,040

(22) Filed: Mar. 17, 2013

(65) Prior Publication Data

US 2014/0156913 A1 Jun. 5, 2014

(30) Foreign Application Priority Data

Dec. 5, 2012 (TW) .............................. 101145711 A

(51) Int. Cl.
*G06F 12/02* (2006.01)
*G06F 3/06* (2006.01)

(52) U.S. Cl.
CPC ............ *G06F 12/0246* (2013.01); *G06F 3/06* (2013.01)

(58) Field of Classification Search
CPC .. G06F 12/14; G06F 12/0246; G06F 12/1483; G06F 12/1408; G06F 12/1416; G06F 12/1458

(Continued)

(56) References Cited

U.S. PATENT DOCUMENTS 8,055,726 B1 11/2011 Shah
8,676,928 B1 * 3/2014 Shah ................... H04L 67/1097
709/212

(Continued)

FOREIGN PATENT DOCUMENTS

TW 201028858 8/2010
TW 201250695 12/2012

OTHER PUBLICATIONS

American Heritage® Dictionary of the English Language, Fifth Edition. Copyright © 2016 by Houghton Mifflin Harcourt Publishing Company. Published by Houghton Mifflin Harcourt Publishing Company. All rights reserved. Downloaded from www.thefreedictionary.com/Counter, Dec. 1, 2016.*

Primary Examiner — Hashem Farrokh
Assistant Examiner — Tracy A Warren
(74) Attorney, Agent, or Firm — Jianq Chyun IP Office

(57) ABSTRACT

A data processing method, a memory controller and a memory storage apparatus are provided. The method includes receiving a write command from a host system. A write data stream corresponding to the write command includes multiple sub-data streams, and each of the sub-data streams is attached with a data index mark by an application installed in the host system. The application determines the data index mark attached to each sub-data stream in accordance with a first rule including a predetermined function, an initial parameter selecting manner and a parameter increasing manner, in which the first rule is pre-agreed by the application with the memory storage apparatus. The method also includes reordering the sub-data streams according to the first rule and the data index mark of each sub-data stream. The method further includes transmitting the reordered sub-data streams to a smartcard chip in the memory storage apparatus.

18 Claims, 12 Drawing Sheets

(58) Field of Classification Search
USPC .................................... 711/7, 101, 103, 115
See application file for complete search history.

(56) References Cited

U.S. PATENT DOCUMENTS

| | | | |
|---|---|---|---|
| 2010/0186077 A1* | 7/2010 | Chang | G06F 12/0246 726/9 |
| 2011/0161552 A1* | 6/2011 | Lund | G06F 12/0246 711/103 |
| 2011/0185435 A1* | 7/2011 | Chang | G06F 12/14 726/27 |
| 2012/0089805 A1* | 4/2012 | Liu | G06F 3/0643 711/173 |
| 2012/0324145 A1* | 12/2012 | Teo | 711/102 |

* cited by examiner

| $P_1$ | $SD_1$ |
|---|---|
| $P_2$ | $SD_2$ |
| $P_3$ | $SD_3$ |
| $P_4$ | $SD_4$ |

FIG. 8A

| $P_4$ | $SD_4$ |
|---|---|
| OSX1 | |
| OSX2 | |
| $P_1$ | $SD_1$ |
| $P_2$ | $SD_2$ |
| $P_3$ | $SD_3$ |

FIG. 8B

| T | L | S | D | F |

FIG. 9A

| T | L | D | F |

FIG. 9B

DATA PROCESSING METHOD, MEMORY CONTROLLER AND MEMORY STORAGE APPARATUS

CROSS-REFERENCE TO RELATED APPLICATION

This application claims the priority benefit of Taiwan application serial no. 101145711, filed on Dec. 5, 2012. The entirety of the above-mentioned patent application is hereby incorporated by reference herein and made a part of this specification.

BACKGROUND

Field of the Invention

The invention is directed to a data processing method. More particularly, the invention is directed to a data processing method adopted by a memory storage apparatus having a rewritable non-volatile memory module and a smartcard chip and a memory storage apparatus and a memory controller using the method.

Description of Related Art

As electronic wallets and pre-payments are gradually accepted by users, smart cards are widely used. The smart card is an integrated circuit chip (IC chip) having components such as a microprocessor, a card operating system, a security module and a memory etc. for performing a predetermined operation. The smart card provides functions of calculation, encryption, two-way communication and security, so that besides data storage, the smart card may provide a protection for the data stored therein. A subscriber identification module (SIM) card utilized in a cell phone applying a global system for mobile communication (GSM) is an application example of the smart card. Generally speaking, the smart card has very limited storage capacity due to the specification of the IC therein.

A memory card is a storage device and typically adopts a NAND flash memory as its storage medium. The NAND flash memory has advantages of being rewritable and erasable, and capable of retaining data stored therein even when no power is supplied to the NAND flash memory. In addition, with the advancement of the fabrication techniques, the NAND flash memory is also provided with many other advantages, such as being small volume, having high access speed and low power consumption, etc.

As for a storage apparatus having both a smart card and a memory card, whether to access to the smart card or the memory card should be determined in advance upon receiving an access command from a host system. However, since the smart card is commonly used to store important information or digital cash related to the user, how to ensure the security for accessing the smart card and improve reliability becomes an important goal to be achieved by the persons skilled in the field.

Nothing herein should be construed as an admission of knowledge in the prior art of any portion of the invention. Furthermore, citation or identification of any document in this application is not an admission that such document is available as prior art to the invention, or that any reference forms a portion of the common general knowledge in the art.

SUMMARY

Accordingly, the invention is directed to a memory storage apparatus, a memory controller and a data processing method capable of correctly processing data to be written to the smartcard chip by the host system.

The invention is directed to a data processing method for a memory storage apparatus having a rewritable non-volatile memory module and a smartcard chip. The rewritable non-volatile memory module includes a plurality of physical erase units, and each of the physical erase units has a plurality of physical program units. The method includes receiving a write command from a host system, wherein a write data stream corresponding to the write command includes a plurality of sub-data streams, and each of the sub-data stream is attached with a data index mark by an application installed in the host system. The write data stream corresponds to an original data stream to be transmitted to the memory storage apparatus by the application. A first rule is pre-agreed by the memory storage apparatus with the application. The first rule includes a predetermined function, an initial parameter selecting manner and a parameter increasing manner. The application selects an initial parameter according to the initial parameter selecting manner, substitutes the initial parameter into the predetermined function so as to obtain the data index mark attached to a first sub-data stream in the original data stream and determines the data index mark individually attached to each of the other sub-data streams according to the parameter increasing manner, the data index mark of the first sub-data stream and a sequence of the sub-data streams in the original data stream. The method further includes reordering the sub-data streams according to the first rule pre-agreed with the application and the data index mark of each of the sub-data streams and transmitting the reordered sub-data streams to the smartcard chip.

According to another exemplary embodiment of the invention, a memory controller configured in a memory storage apparatus having a rewritable non-volatile memory module and a smartcard chip is provided. The memory controller includes a host interface, a memory interface and a memory management circuit. The host interface is configured to couple to a host system. The memory interface is configured to couple to the rewritable non-volatile memory module, wherein the rewritable non-volatile memory module has a plurality of physical erase units, and each of the physical erase units has a plurality of physical program units. The memory management circuit is coupled to the host interface and the memory interface and receive a write command from the host system. A write data stream corresponding to the write command comprises a plurality of sub-data streams, and each of the sub-data streams is attached with a data index mark by an application installed in the host system. The write data stream corresponds to an original data stream to be transmitted to the memory storage apparatus by the application write data stream, and a first rule is pre-agreed by the memory storage apparatus with the application. The first rule includes a predetermined function, an initial parameter selecting manner and a parameter increasing manner. The application selects an initial parameter according to the initial parameter selecting manner, substitutes the initial parameter into the predetermined function so as to obtain the data index mark attached to a first sub-data stream in the original data stream and determines the data index mark individually attached to each of the other sub-data streams among the sub-data streams according to the parameter increasing manner, the data index mark of the first sub-data stream and a sequence of the sub-data streams in the original data stream. The memory management circuit is further configured to reorder the sub-data streams according to the first rule pre-agreed by the memory storage apparatus with the application and the data index mark of each of the sub-data streams. The memory management circuit is further configured to transmit the reordered sub-data streams to the smartcard chip.

According to still another exemplary embodiment of the invention, a memory storage apparatus including a connector, a rewritable non-volatile memory module, a smartcard chip and a memory controller is provided. The connector is configured to couple to a host system. The rewritable non-volatile memory module has a plurality of physical erase units, and each of the physical erase units has a plurality of physical program units. The memory controller is coupled to the connector, the rewritable non-volatile memory module and the smartcard chip and configured to receive a write command from the host system. A write data stream corresponding to the write command includes a plurality of sub-data streams, and each of the sub-data streams is attached with a data index mark by an application installed in the host system. The write data stream corresponds to an original data stream to be transmitted to the memory storage apparatus by the application. A first rule is pre-agreed by the memory storage apparatus with the application, and the first rule includes a predetermined function, an initial parameter selecting manner and a parameter increasing manner. The application selects an initial parameter according to the initial parameter selecting manner, substitutes the initial parameter into the predetermined function so as to obtain the data index mark attached to a first sub-data stream in the original data stream and determines the data index mark individually attached to each of the other sub-data streams among the sub-data streams according to the parameter increasing manner, the data index mark of the first sub-data stream and a sequence of the sub-data streams in the original data stream. The memory controller is further configured to reorder the sub-data streams according to the first rule pre-agreed with the application, and the data index mark of each of the sub-data streams and transmit the reordered sub-data streams to the smartcard chip.

To sum up, in the invention, after receiving the write data stream transmitted by the application installed in the host system, the write data stream is transmitted to the smartcard chip according to the data index marks attached thereto. Meanwhile, the host system and the memory storage apparatus transmit data according to the pre-agreed rule. As such, it can be ensured that while the accurate data is received by the smartcard chip, the possibility of being interfered by malicious applications during the data transmission can be reduced.

In order to make the aforementioned and other features and advantages of the invention more comprehensible, several embodiments accompanied with figures are described in detail below.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a portion of this specification. The drawings illustrate embodiments of the invention and, together with the description, serve to explain the principles of the invention.

FIG. 8A through 8D are schematic diagrams of data processing according to an exemplary embodiment of the invention.

FIG. 9A is a schematic diagram illustrating the write command issued to the smartcard chip according to an exemplary embodiment of the invention.

FIG. 9B is a schematic diagram illustrating a response message corresponding to the write command according to an exemplary embodiment of the invention.

DESCRIPTION OF THE EMBODIMENTS

Figure 1A:
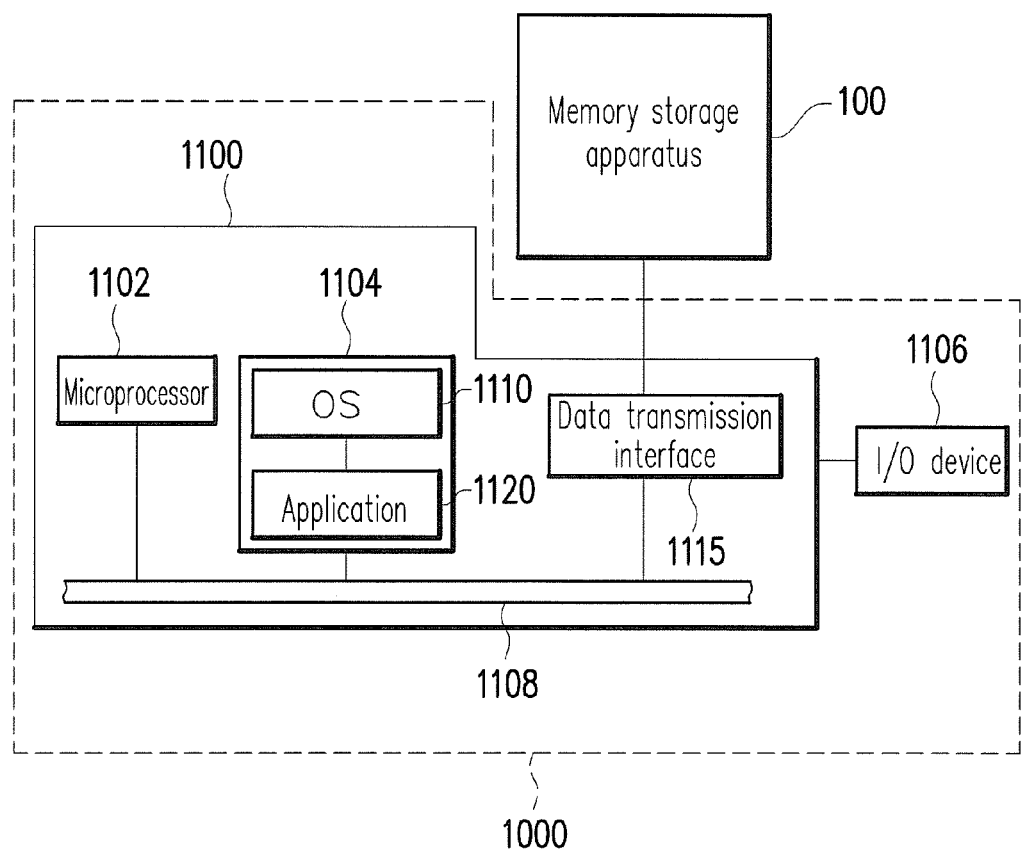
FIG. 1A is a schematic diagram illustrating a host system using a memory storage apparatus according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (also referred to as a memory storage system) includes a rewritable non-volatile memory module and a controller (also referred to as a control circuit). The memory storage apparatus is usually used together with a host system, such that the host system can write data into or read data from the memory storage apparatus.

FIG. 1A is a schematic diagram illustrating a host system using a memory storage apparatus according to an exemplary embodiment of the invention.

Figure 1B:
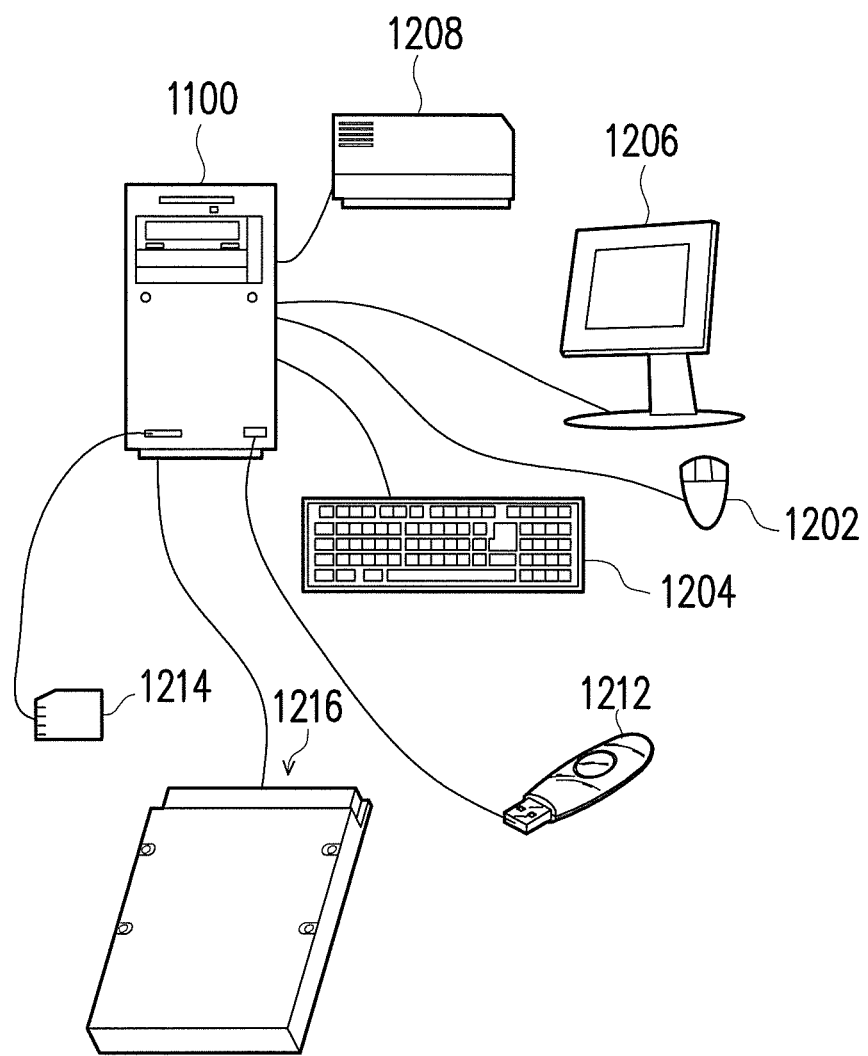
FIG. 1B is a schematic diagram illustrating a computer, an input/output (I/O) device, and a memory storage apparatus according to an exemplary embodiment of the invention.

A host system 1000 includes a computer 1100 and an input/output (I/O) device 1106. The computer 1100 includes a microprocessor 1102, a random access memory (RAM) 1104, a system bus 1108, and a data transmission interface 1115. The microprocessor 1102 executes an operating system (OS) 1110 and an application 1120 installed in the storage apparatus 1104, so that the host system 1000 can provide corresponding functions according to a user's operations. The I/O device 1106 includes a mouse 1202, a keyboard 1204, a display 1206, and a printer 1208 as shown in FIG. 1B. It should be understood that the I/O device 1106 is not limited to the devices illustrated in FIG. 1B and may further include other devices.

In the present exemplary embodiment, the memory storage apparatus 100 is electrically connected to the devices of the host system 1000 through the data transmission interface 1115. By using the microprocessor 1102, the RAM 1104 and the I/O device 1106, the host system 1000 may write the data into or read the data from the memory storage apparatus 100. For instance, the memory storage apparatus 100 may be a flash drive 1212, a memory card 1214, or a solid state drive (SSD) 1216, as shown in FIG. 1B.

Figure 1C:
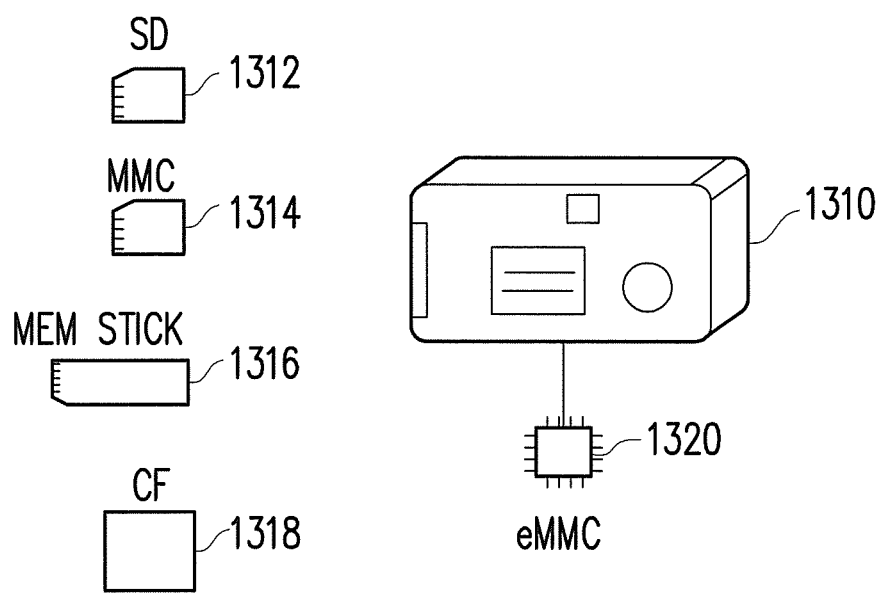
FIG. 1C is a schematic diagram illustrating a host system and a memory storage apparatus according to another exemplary embodiment of the invention.

Generally speaking, the host system 1000 may be any system that can store data. Even though the host system 1000 is described as a computer system in the present exemplary embodiment, in another exemplary embodiment of the invention, the host system 1000 may also be a cell phone, a digital camera, a video camera, a communication device, an audio player, a video player, etc. For instance, when the host system is a digital camera 1310, the memory storage apparatus is a secure digital (SD) card 1312, a multimedia card (MMC) 1314, a memory stick 1316, a compact flash (CF) card 1318, or an embedded storage device 1320 used by the digital camera 1310 (as shown in FIG. 1C.). The embedded storage device 1320 includes an embedded MMC (eMMC). It should be mentioned that the eMMC is directly electrically connected to the substrate of the host system.

Figure 2:
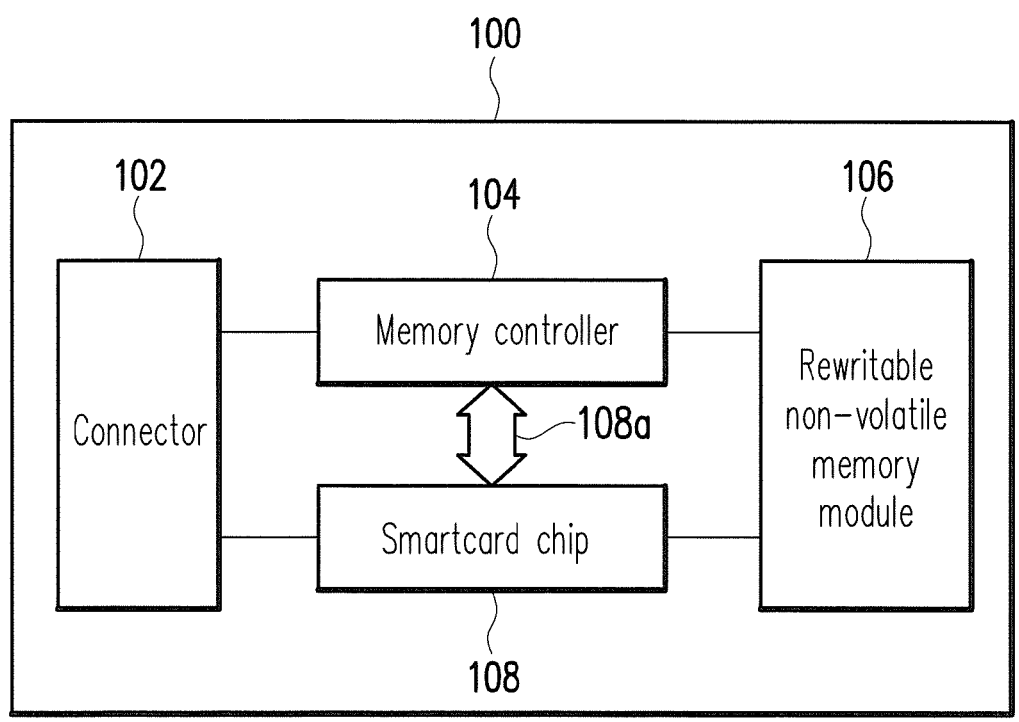
FIG. 2 is a schematic block diagram illustrating the memory storage apparatus depicted in FIG. 1A.

FIG. 2 is a schematic block diagram illustrating the memory storage apparatus 100 depicted in FIG. 1A. Referring to FIG. 2, the memory storage apparatus 100 includes a connector 102, a memory controller 104, a rewritable non-volatile memory module 106 and a smartcard chip 108.

The connector 102 is coupled to the memory controller 104 and configured to be coupled to the host system 1000. In the present exemplary embodiment, the transmission interface supported by the connector 102 is a secure digital (SD) interface. However, in other exemplary embodiments, the transmission interface supported by the connector 102 may be a serial advanced technology attachment (SATA) interface, a multimedia card (MMC) interface, a parallel advanced technology attachment (PATA) interface, an institute of electrical and electronic engineers (IEEE) 1394 interface, a peripheral component interconnect (PCI) Express interface, a universal serial bus (USB) interface, a ultra high speed-I (UHS-I) interface, a UHS-II interface, a memory stick (MS) interface, an embedded multimedia card (eMMC) interface, a universal flash storage (UFS) interface, a compact flash (CF) interface or an integrated drive electronics (IDE) interface, or any suitable interface, but the invention is not limited thereto.

The memory controller 104 executes a plurality of logic gates or control commands implemented in a hardware form or a firmware form and performs data operations, such as data writing, data reading, and data erasing, in the rewritable non-volatile memory module 106 according to commands from the host system 1000. Here, the memory controller 104 is further configured to processes data to be written into the smartcard chip 108 by the host system 1000 using a data processing method according to the present exemplary embodiment, which will be described in detail with reference to the drawings later.

The rewritable non-volatile memory module 106 is coupled to the memory controller 104. For instance, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, any other flash memory module, or any other memory module having the same characteristics. Moreover, the rewritable non-volatile memory module 106 includes a plurality of physical erase units, and each physical erase unit has a plurality of physical program units. The physical program unit belonging to the same physical erase unit may be independently may be individually written and simultaneously erased. That is, the physical erase unit is the smallest unit for erasing data. Namely, each of the physical erase units contains the least number of memory cells that are erased all together. The physical program unit is the smallest unit for programming data. Namely, the physical program unit is the smallest unit for writing data. In the present exemplary embodiment, the physical erase units are physical blocks, and the physical program units are physical pages, but the invention is not limited thereto.

Figure 3:
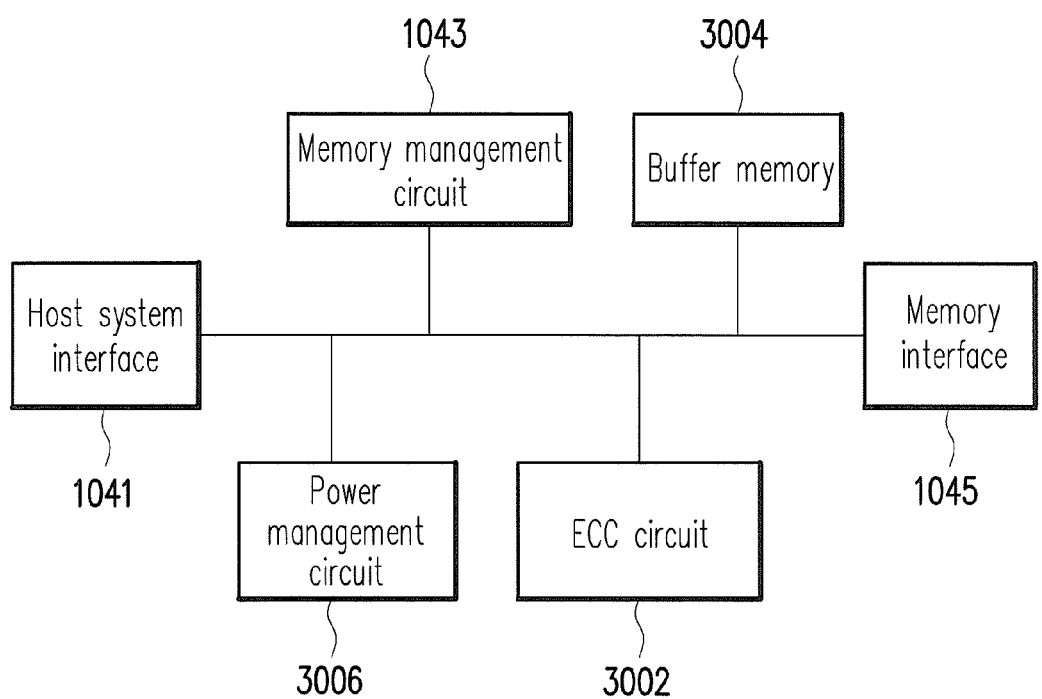
FIG. 3 is a schematic block diagram illustrating a memory controller according to an exemplary embodiment of the invention.

FIG. 3 is a schematic block diagram illustrating a memory controller according to an exemplary embodiment of the invention. Referring to FIG. 3, memory controller 104 includes a host system interface 1041, a memory management circuit 1043 and a memory interface 1045.

The host system interface 1041 is coupled to the memory management circuit 1043 and coupled to the host system 1000 via the connector 102. The host system interface 1041 is configured to receive and identify the commands and data transmitted from the host system 1000. Accordingly, the commands and data from the host system 1000 are transmitted to the memory management circuit 1043 through the host system interface 1041. In the present exemplary embodiment, host system interface 1041 corresponding to the connector 102 is a SD interface. However, in other exemplary embodiments, the host system interface 1041 may also be a SATA interface, a MMC interface, a PATA interface, an IEEE 1394 interface, a PCI Express interface, a USB interface, a UHS-I interface, a UHS-II interface, an eMMC interface, a UFS interface, a MS interface, a CF interface, an IDE interface, or any other standardized interface.

The memory management circuit 1043 is configured to control the overall operation of the memory controller 104. To be specific, the memory management circuit 1043 has a plurality of control commands, and when the memory storage apparatus 100 is powered on, the control commands are executed to perform the data processing method of the present exemplary embodiment.

In an exemplary embodiment, the control commands of the memory management circuit 1043 are implemented in a firmware form. For instance, the memory management circuit 1043 has a micro-processor unit (not shown) and a read-only memory (not shown), and these control commands are burned in the read-only memory. When the memory storage apparatus 100 is powered on, these control commands are executed by the micro-processor unit to perform the data processing method of the present exemplary embodiment.

In another exemplary embodiment of the invention, the control commands of the memory management circuit 1043 may also be stored in a specific area of the rewritable non-volatile memory module 106 (for example, a system area exclusively used for storing system data in the rewritable non-volatile memory module 106) in a form of program codes. Additionally, the memory management circuit 1043 may have a micro-processor unit (not shown), a read-only memory (not shown) and a random access memory (not shown). In particular, the read-only memory has boot codes, and when the memory controller 104 is enabled, the micro-processor unit first executes the boot codes to load the control commands stored in the rewritable non-volatile memory module 106 into the random access memory of the memory management circuit 1043. The micro-processor unit then executes said control commands to perform the data processing method of the present exemplary embodiment.

Moreover, in another exemplary embodiment of the invention, memory management circuit 1043 the control commands of the memory management circuit 1043 may also be implemented in a hardware form. For instance, the memory management circuit 1043 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are electrically connected to the microcontroller. The memory management unit is configured to manage the physical erase units in the rewritable non-volatile memory module 106. The memory writing unit is configured to issue a write command to the rewritable non-volatile memory module 106 so as to write data into the rewritable non-volatile memory module 106. The memory reading unit is configured to issue a read command to the rewritable non-volatile memory module 106 so as to read data from the rewritable non-volatile memory module 106. The memory erasing unit is configured to issue an erase command o the rewritable non-volatile memory module 106 so as to erase data from the rewritable non-volatile memory module 106. The data processing unit is configured to process both the data to be written into the rewritable non-volatile memory module 106 and the data to be read from the rewritable non-volatile memory module 106.

The memory interface 1045 is coupled to the memory management circuit 1043, such that the memory controller 104 may be coupled with the rewritable non-volatile memory module 106. Accordingly, the memory controller 104 may execute related operations on the rewritable non-volatile memory module 106. Namely, data to be written into the rewritable non-volatile memory module 106 is converted by the memory interface 1045 into a format acceptable to the rewritable non-volatile memory module 106.

In an exemplary embodiment of the invention, the memory controller 104 further includes an error checking and correcting (ECC) circuit 3002. The ECC circuit 3002 is coupled to the memory management circuit 1043 and configured to perform an ECC procedure to so as to ensure the correctness of data. To be specific, when the memory management circuit 1043 receives a write command from the host system 1000, the ECC circuit 3002 generates an ECC code corresponding to the write command, and the memory management circuit 1043 writes the data and the ECC code corresponding to the write command to the rewritable non-volatile memory module 106. Afterward, when reading data from the rewritable non-volatile memory module 106, the memory management circuit 1043 simultaneously reads the ECC code corresponding to the data, and the ECC circuit 3002 performs the ECC procedure according to corresponding to the read ECC code corresponding to the data so as to identify whether there is an error bit in the data.

In another exemplary embodiment of the invention, the memory controller 104 further includes a buffer memory 3004. The buffer memory 3004 may be a static random access memory (SRAM), a dynamic random access memory (DRAM), or any other suitable random access memory, which is not construed as a limitation to the invention. The buffer memory 3004 is coupled to the memory management circuit 1043 and configured to temporarily store data and commands received from the host system 1000 or data received from the rewritable non-volatile memory module 106.

In still another exemplary embodiment of the invention, the memory controller 104 further includes a power management circuit 3006. The power management circuit 3006 is coupled to the memory management circuit 1043 and configured to control the power supply of the memory storage apparatus 100.

Figure 4:
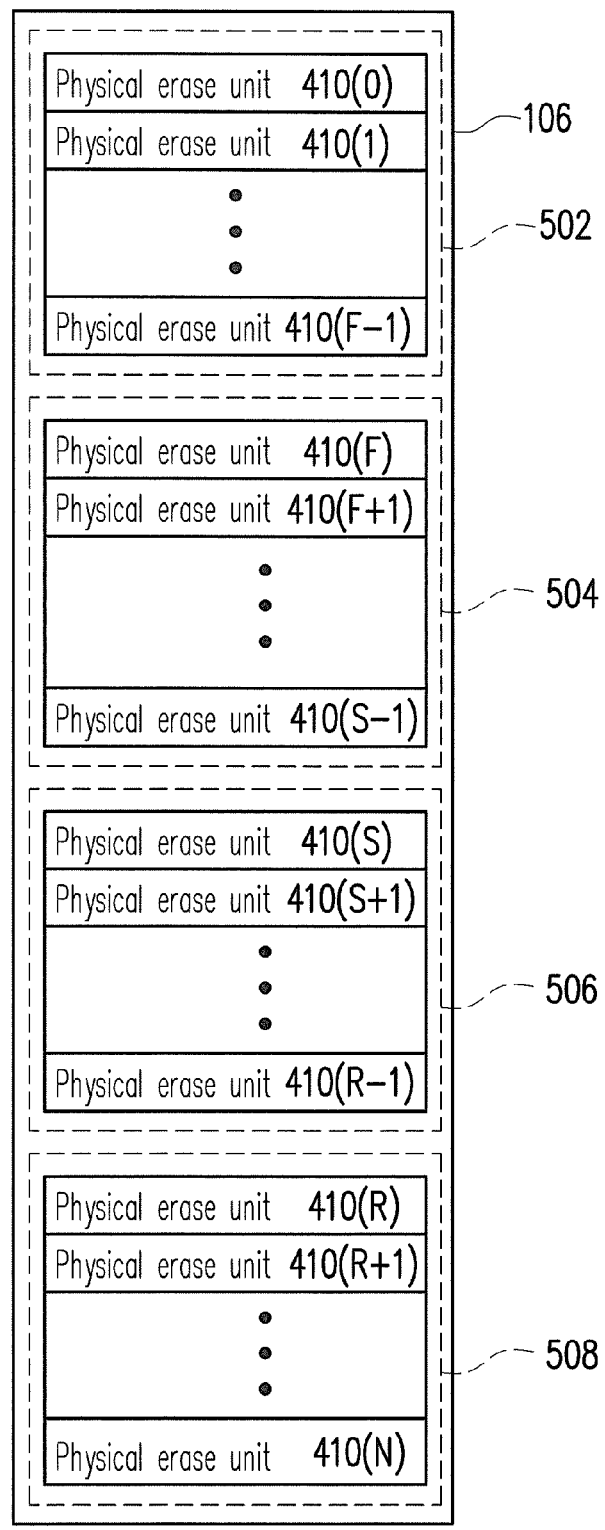
FIG. 4 and FIG. 5 are schematic diagrams illustrating management of a rewritable non-volatile memory module according to an exemplary embodiment of the invention.
Figure 5:
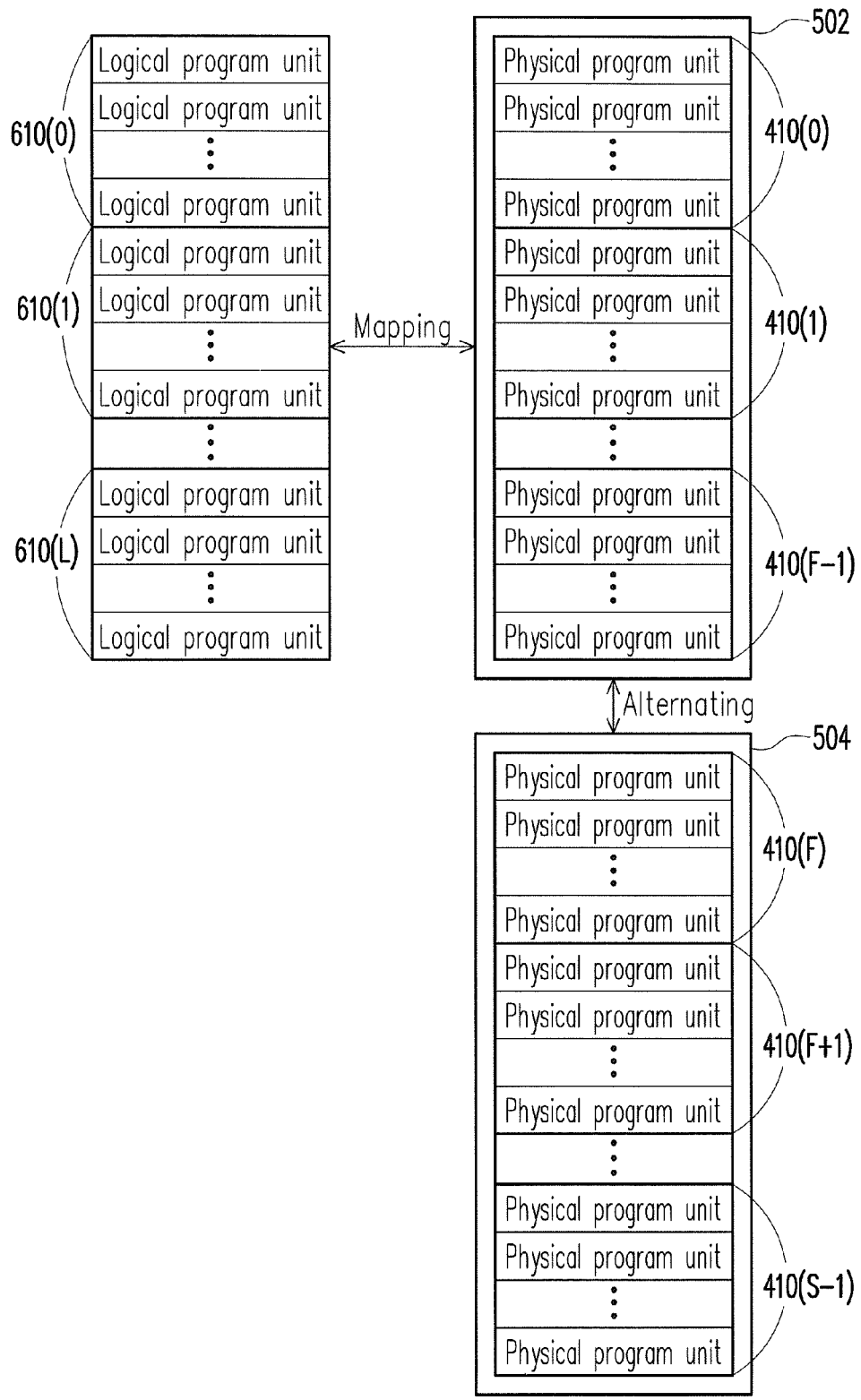

FIG. 4 and FIG. 5 are schematic diagrams illustrating management of a rewritable non-volatile memory module according to an exemplary embodiment of the invention.

It should be understood that the terms used herein for describing the operations (such as "get", "exchange", "group", and "alternate") performed on the physical erase units of the rewritable non-volatile memory module 106 refer to logical operations performed on these physical erase units. Namely, the physical erase units in the rewritable non-volatile memory module 106 are only logically operated by the aforementioned operations and the actual positions of the physical erase units are not changed.

Referring to FIG. 4, in this present exemplary embodiment, the rewritable non-volatile memory module 106 includes physical erase unit 410(0)~410(N). The memory management circuit 1043 of the memory controller 104 logically groups the physical erase units 410(0)~410(N) into a data area 502, a spare area 504, a system area 506, and a replacement area 508. The reference letters F, S, R, and N labeled in FIG. 4 are positive integers which represent a number of the physical erase units allocated in each area and may be determined according to a capacity of the rewritable non-volatile memory module 106 used by the manufacturer of the memory storage apparatus 100.

The physical erase units logically belonging to the data area 502 and the spare area 504 are for storing data from the host system 1000. For instance, the physical erase units belonging to the data area 502 are considered as physical erase units where data is stored, and the physical erase units belonging to the spare area 504 are used for writing new data. Hence, the physical erase units belonging to the spare area are either blank or available physical erase units (i.e., no data is recorded in these units or data recorded in these units is marked as invalid data). When write commands and the data to be written are received from the host system 1000, the memory management circuit 1043 retrieves a physical erase unit from the spare area 504 and writes the data into the retrieved physical erase unit for substituting the physical erase unit in the data area 502. Alternatively, when it is necessary to perform a data merge operation on a logical erase unit, the memory management circuit 1043 retrieves a physical erase unit from the spare area 504 and writes data into the retrieved physical erase unit so as to replace the physical erase unit originally mapping to the logical erase unit.

The physical erase units logically belonging to the system area 506 are used for recording system data. For instance, the system data includes the manufacturers and models of the rewritable non-volatile memory module 106, the number of physical erase units in the rewritable non-volatile memory module 106, the number of physical program units in each physical erase unit and so on.

The physical erase units logically belonging to the replacement area 508 are used for replacing damaged physical erase units if any physical erase unit belonging to the data area 502, the spare area 504, or the system area 506 is damaged. Particularly, during operation of the memory storage apparatus 100, if there are still normal physical erase units in the replacement area 508, and a physical erase unit in the data area 502 is damaged, the memory management circuit 1043 gets a normal physical erase unit from the replacement area 508 to replace the damaged physical erase unit in the data area 502. If there is no more normal physical erase unit in the replacement area 508, and a physical erase unit is damaged, the memory management circuit 1043 announces that the entire memory storage apparatus 100 is in a write-protect mode, and thus no more data may be written into the memory storage apparatus 100.

Based on the above, during the operation of the memory storage apparatus 100, the physical erase units belonging to the data area 502, the spare area 504, the system area 506, and the replacement area 508 are dynamically changed. For instance, the physical erase units used for alternatively storing data are dynamically belonging to the data area 502 or the spare area 504.

Referring to FIG. 5, the memory management circuit 1043 (or the memory controller 104) configures a plurality of logical erase units 610(0)~610(L) for mapping to the physical erase units 410(0) to 410(F−1) in the data area 502, so that the host system 1000 may access the rewritable non-volatile memory module 106. Here, each of the logical erase units 610(0)~610(L) includes a plurality of logical program units, and the logical program units in the logical erase units 610(0)~610(L) are mapped to the physical program units in the physical erase units 410(0) to 410(F−1).

In detail, the memory management circuit 1043 (or the memory controller 104) provides the configured logical erase units 610(0)~610(L) to the host system 1000, and maintains a logical address-physical address mapping table for recording the mapping relation between the logical erase units 610(0)~610(L) and the physical erase units 410(0)~410(F−1). Therefore, when the host system 1000 is about to access a logical address, the memory management circuit 1043 (or the memory controller 104) confirms the logical erase units and logical program units that are corresponding to the logical address, and searches for a physical program unit mapped thereto through the logical address-physical address mapping table for performing the access operation.

Figure 6:
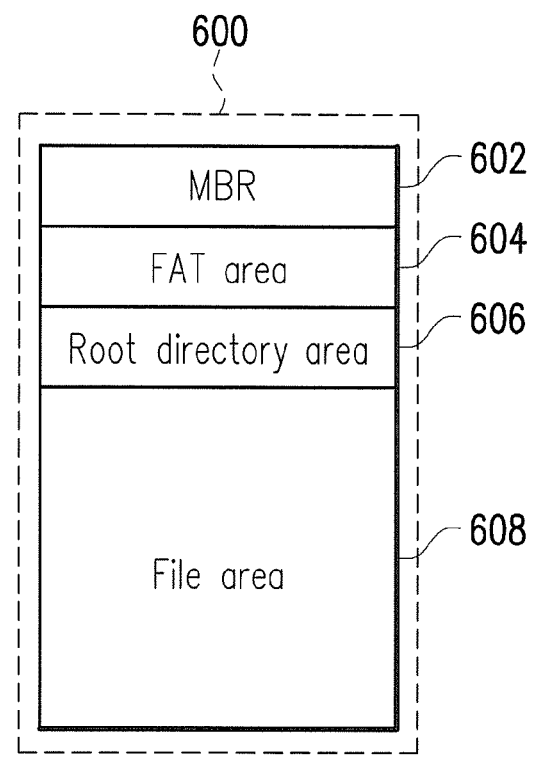
FIG. 6 illustrates an example of formatting logical addresses of a rewritable non-volatile memory module by using a file system according to an exemplary embodiment of the invention.

In the present exemplary embodiment, the logical erase units 610(0)~610(L) are formatted to a partition 600 by the OS 1110 of the host system 1000 according to a file system, as illustrated in FIG. 6. The partition 600 includes a master boot record (MBR) 602, a file allocation table (FAT) area 604, a root directory area 606 and a file area 608.

Logical program units belonging to the MBR 602 are used for storing system information of the storage space of the memory storage apparatus 100.

Logical program units belonging to the FAT area 604 are used for storing FATs. The FATs are used for recording clusters corresponding to logical addresses for files. For instance, the FAT area stores two FATs, and one of the FATs is normally accessed while the other FAT is a backup FAT.

Logical program units belonging to the root directory area 606 are used for storing file description blocks (FDB). The FDBs are used for recording attribute information of files and directories currently stored in the memory storage apparatus 100. Specifically, a FDB records a starting logical block address (i.e., a starting cluster) for storing the file.

Logical program units belonging to the file area 608 are grouped into a plurality of clusters and are actually used for storing file contents. In detail, the smallest unit in a disk is one sector and each sector can store 512 bytes of information contents. However, when storing data in unit of each sector, the performance of the host system 1000 would be not well. In general, the OS 1110 of the host system 1000 would not take each sector as a unit of accessing data, but takes each cluster as a basic access unit. Each cluster is constructed with $2^n$ sectors. For example, if one cluster is constructed of 8 continuous sectors, then the size of the cluster is 4096 bytes. Accordingly, the OS 1110 writes or reads data with 8 continuous sectors to enhance the efficiency of accessing data.

Returning to FIG. 2, in the present exemplary embodiment, the memory storage apparatus 100 further includes a smartcard chip 108. The smartcard chip 108 is coupled to the memory controller 104 through an interface 108a, wherein the interface 108a is specifically used to communicate with the smartcard chip 108.

The smartcard chip 108 has a microprocessor, a security module, a read only memory (ROM), a random access memory (RAM), an electrically erasable programmable read-only memory (EEPROM), and an oscillator, etc, which are not shown in FIG. 2. The microprocessor is configured to control the entire operation of the smartcard chip 108. The security module is configured to encrypt and decrypt data stored to the smartcard chip 108. The oscillator is configured to generate a clock signal required during the operation of the smartcard chip 108. The RAM is configured temporarily store calculated data or a firmware program. The EEPROM is configured to store user data. The ROM is configured to store the firmware program of the smartcard chip 108. Particularly, when the smartcard chip 108 is operated, the microprocessor of the smartcard chip 108 executes the firmware stored in the ROM to perform related operations.

Specifically, the security module of the smartcard chip 108 executes a security mechanism to prevent an attack with an intention to steal the data stored in the smartcard chip 108. For instance, such attack includes a timing attack, a single-power-analysis attack or a differential-power-analysis. Moreover, the security mechanism executed by the smartcard chip 108 is in compliance with a third level or a higher level of federal information processing standards (FIPS) 140-2 or a third level or a higher level of EMV EL (Europay, MasterCard and Visa evaluation level). Namely, the smartcard chip 108 is qualified by the authentication of higher than a fourth level of FIPS 140-2 or by the authentication of higher than a fourth level of EMV EL. Here, the FIPS are open standards specified by U.S. federal government for government agencies and government contractors except military institutions, wherein FIPS 140-2 specifies data security levels. Moreover, the EMV is a professional trade and authentication standard specification specified by the international financial industry for point-of-sale (POS) terminals capable of using smart cards and chip cards and automatic teller machines (ATMs) widely used in banking institutions. Such specification includes standards set for related software and hardware of the payment system of chip credit cards and cash cards. In the present exemplary embodiment, based on the operation of the smartcard chip 108, the memory storage apparatus 100 may provide services having an ID authentication function, for example, a micro-payment service and a ticket service, etc.

It should be noticed that the smartcard chip 108 receives commands and data from the host system 1000 or transmits data to the host system 1000 via the connector 102 of the memory storage apparatus 100 rather than directly communicates with the host system 1000 through a smart card interface (i.e. the interface 108a). Accordingly, in the present exemplary embodiment, the application 1120 is installed in the host system 1000, and a specific communication file is used to transmit a command data unit (for example, a command-application protocol data unit (C-APDU)) to the smartcard chip 108 and receive a response data unit (for example, a response-application protocol data unit (R-APDU)) of the smart card chip 108.

Furthermore, the memory controller 104 generates one or a plurality of communication files in the memory storage apparatus 100 and transmits information of logical addresses used for storing the one or the plurality of communication files to the application 1120. For instance, when the application 1120 issues a command to store a communication file in the memory storage apparatus 100, the OS 1110 uses a portion of logical addresses to write the communication file according to the file system (not shown) of the memory storage apparatus 100. Here, the logical addresses used for storing the communication file are referred to as specific logical addresses. Then, any operation performed on the smart cart chip 108 is implemented by the application 1120 accessing the communication file. For instance, the application 1120 transmits the C-APDU to the memory storage apparatus 100 through a write command of the communication file and reads the R-APDU from the memory storage apparatus 100 through a read command of the communication file. It is to be mentioned that in other operation systems, the application 1120 may also directly access the specific logical addresses used for storing the communication file so as to perform operations on the smartcard chip 108.

In the present exemplary embodiment, a first rule is pre-agreed by the host system 1000 (or the application 1120 installed in the host system 1000) with the memory storage apparatus 100, and a write operation is performed on the smartcard chip 108 according to the first rule. The first rule includes a predetermined function, an initial parameter selecting manner and a parameter increasing manner. Here, the initial parameter selecting manner is associated with how to select an initial parameter. For example, when the initial parameter selecting manner is based on dates, the application 1120 configures a current date as an initial parameter. The parameter increasing manner is associated with incrementing regularity or decrementing regularity between two parameters used for generating two sequential data index marks. For instance, given that the parameter increasing manner is incrementing having an increment of 1, then a parameter used for generating the a second data index mark is 2 if a parameter used for generating a first data index mark is 1.

When being about to write original data stream to the smartcard chip 108, the application 1120 divides original data stream into a plurality of sub-data streams according to a storage capacity of the smallest access unit (for example, a size of a sector (i.e. 512 bytes), but the invention is not limited thereto. Meanwhile, the application 1120 selects an initial parameter according to the initial parameter selecting manner and then, substitutes the initial parameter into the predetermined function so as to obtain a first data index mark. The first data index mark is attached to a first sub-data stream divided from the original data stream. Then, the application 1120 determines data index marks individually attached to the other sub-data streams according to the parameter increasing manner, the data index mark of the first sub-data stream and the sequence of all the sub-data streams in the original data stream.

The original data stream to be written by the application 1120 has to be transmitted to the memory storage apparatus 100 via the OS 1110, while in order to increase the entire accessing speed, the OS 1110 performs an optimization process on the sequence for accessing the clusters in the file area 608. Accordingly, the sequence of each sub-data stream accessed by the OS 1110 may be identical to or different from the sequence thereof in the original data stream after performing the optimization process. That is, even though the OS 1110 issues a write command to the memory storage apparatus 100 in response to a write command from the application 1120, a write data stream actually received by the memory management circuit 1043 (or the memory controller 104) may be different from the original data stream to be written by the application 1120.

However, in the present exemplary embodiment, each sub-data stream is attached with the data index mark representing its sequence in the original data stream by the application 1120, and thus, after the write data stream is received by the memory management circuit 1043 (or the memory controller 104), all the sub-data streams are reordered according to the first rule and the data index mark of each sub-data stream, so that the sub-data streams are restored in the sequence that is the same as the sequence of the sub-data stream in the original data stream, and the reordered sub-data streams are transmitted to the smartcard chip 108. To be specific, the memory management circuit 1043 (or the memory controller 104) confirms the initial parameter selected by the application 1120 according to the initial parameter selecting manner and then, obtains a function value by substituting the initial parameter into the predetermined function so as to reorder all the sub-data streams in the sequence matching the sequence thereof in the original data stream according to the function value, the parameter increasing manner and the data index mark of each sub-data stream.

For example, it is assumed that the predetermined function is formula (1) as follows: (1):

$$F(X)=X^2 \qquad (1)$$

Therein, X is a parameter value. It is also assumed that the memory management circuit 1043 (or the memory controller 104) confirms that an initial parameter selected by the application 1120 according to the initial parameter selecting manner is 3, and the parameter increasing manner is incrementing with an increment of 1. If a sub-data stream Y attached with a data index mark of 9 is received, and a value of 3 is obtained by performing a square root calculation on 9 based on the corresponding formula (1), the memory management circuit 1043 (or the memory controller 104) may determine that the sub-data stream Y is the first sub-data stream in the original data stream. Further, according to the parameter increasing manner, it may be determined that a parameter of a data index mark for generating a second sub-data stream is 4. Thus, the second sub-data stream in the original data stream may be found by searching for a sub-data stream having a corresponding data index mark parameter equaling to the square of 4 (i.e. 16) among all the received sub-data streams. Likewise, the sequence of each sub-data stream in the original data stream may be obtained so as to reorder the sub-data streams accordingly.

In other exemplary embodiments, the predetermined function may be a formula (2) as follows:

$$F(X)=X^3 \qquad (2)$$

Therein, X is a parameter; however, it is to be mentioned that the formulas (1) and (2) are merely examples for illustration, and the invention is not limited thereto.

Figure 7:
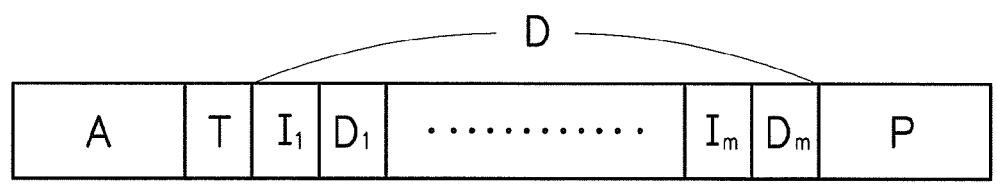
FIG. 7 is a schematic diagram of an operation system issuing a write command according to an exemplary embodiment of the invention.

FIG. 7 is a schematic diagram of an operation system 1110 issuing a write command according to an exemplary embodiment of the invention. Referring to FIG. 7, a column A is used for recording a logical address to write to. A column T is used for recording a special mark to indicate that the write data stream is to be written to the smartcard chip 108. A column D is used for recording the data content to be written, wherein each of $D_1$ through $D_m$ used for recording the content of each sub-data stream while each of $I_1$ through $I_m$ used for recording the content of each corresponding data index mark, and m is a positive integer. A column P is used for recording information associated with a detection mechanism for preventing write errors.

FIG. 8A through FIG. 8D illustrate how the host system 1000 and the memory storage apparatus 100 correctly perform the write operation to the smartcard chip 108 according to the first rule when the application 1120 is to write the original data stream.

Referring to FIG. 8A, given that the application 1120 divides the original data stream into a plurality of sub-data streams $SD_1$ through $SD_4$ sequentially according to a storage capacity of the smallest access unit of the host system 1000. For the first sub-data stream $SD_1$, the application 1120 selects an initial parameter according to the initial parameter selecting manner and obtains a data index mark $P_1$ to be attached to the first sub-data stream $SD_1$ by substituting the initial parameter in to the predetermined function. If it is assumed that the value of the initial parameter is 1, and the predetermined function is the formula (1), the value of the data index mark $P_1$ is 1. For the other three sub-data streams $SD_2$ through $SD_4$, the application 1120 generates three data index marks $P_2$ through $P_4$ according to the parameter increasing manner, the previously generated data index mark $P_1$ of the first sub-data stream $SD_1$. Following the preceding example, if the parameter increasing manner is incrementing and has an increment of 1, then three parameters for generating the data index marks $P_2$ through $P_4$ of the sub-data streams $SD_2$ through $SD_4$ have values of 2, 3 and 4, respectively. By substituting the three parameters into the formula (1), values of the data index mark $P_2$ through $P_4$ respectively to be attached to the sub-data streams $SD_2$ through $SD_4$ have values of 4, 9 and 16, respectively. However, it should be noticed that the predetermined function, the initial parameter selecting manner and the parameter increasing manner are illustrated as examples, and the invention is not limited thereto.

In the present exemplary embodiment, in order to increase the entire accessing speed, the OS 1110 does not access according to the sequence of the sub-data streams $SD_1$ through $SD_4$ in the original data stream, and thus, some auxiliary data streams are additionally required during the process of looking up in a file system. Referring to FIG. 8B, given that the sequence actually accessed by the OS 1110 is sub-data stream $SD_4$, an auxiliary data stream $OSX_1$, an auxiliary data stream $OSX_2$, the sub-data stream $SD_1$, the sub-data stream $SD_2$ and the sub-data stream $SD_3$, then, the write data stream corresponding to the write command which is received by the memory management circuit 1043 (or the memory controller 104) includes the sub-data streams and the auxiliary data streams as presented in the sequence shown in FIG. 8B.

Figures 8C, 8D:
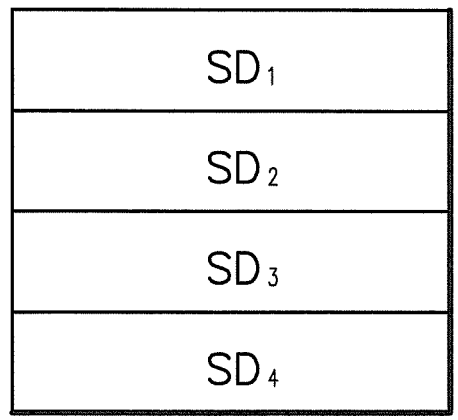

After receiving the write command, the memory management circuit 1043 (or the memory controller 104) does not transmit each of the sub-data streams to the smartcard chip 108 directly according to the sequence shown in the FIG. 8B, but confirms the data index mark (i.e. the data index mark $P_1$) to be attached to the first sub-data stream by the application 1120 according to the first rule and identifies which sub-data stream to be the first sub-data stream (i.e. the sub-data stream $SD_1$) accordingly. Meanwhile, the memory management circuit 1043 (or the memory controller 104) confirms the data index marks $P_2$ through $P_4$ to be attached to the sub-data streams $SD_2$ through $SD_4$ according to the data index mark $P_1$ and the parameter increasing manner while the sequence of the data index mark $P_1$ through $P_4$ may be identified merely according to the parameter increasing manner. As such, the sub-data stream $SD_1$ through $SD_4$ may be reordered in the sequence complying with the sequence thereof in the original data stream. Besides, after receiving the write command issued by the OS 1110 and recognizing the special mark in the column T, the memory management circuit 1043 (or the memory controller 104) assumes that all the data steams in the column D are to be written to the smartcard chip 108. However, when examining that the auxiliary data streams $OSX_1$ and $OSX_2$ are not attached with any data index marks, the memory management circuit 1043 (or the memory controller 104) deter nines that the auxiliary data streams $OSX_1$ and $OSX_2$ do not belong to the original data stream that is about to be written by the application 1120. Accordingly, the memory management circuit 1043 (or the memory controller 104) transmits the data content as shown in FIG. 8C to the smartcard chip 108 after reordering the sub-data streams $SD_1$ through $SD_4$ and removing the auxiliary data streams $OSX_1$ and $OSX_2$.

In another exemplary embodiment, referring to FIG. 8D, given that the OS 1110 does not change the sequence of accessing each of the sub-data streams, but there is a malicious application in the host system 1000, such that two malicious data streams $X_1$ and $X_2$ may also be written while the OS 1110 writes the sub-data streams $SD_2$ and $SD_3$. Since the malicious data streams $X_1$ and $X_2$ are also not attached with data index marks by the application 1120, the malicious data streams $X_1$ and $X_2$ are also removed when the memory management circuit 1043 (or the memory controller 104) is ready for transmitting data to the smartcard chip 108. Thus, the operation of writing to the smartcard chip 108 may be prevented from being interfered by the malicious application.

In another exemplary embodiment, beside the first rule, a second rule is further pre-agreed by the host system 1000 (or the application 1120 installed in the host system 1000) with the memory storage apparatus 100. By performing the write operation on the smartcard chip 108 according to the first rule and the second rule, the possibility of being interfered by the malicious application may be further reduced.

In detail, all communication files stored in the file area 608 are configured as a communication interface between the host system 1000 and the smartcard chip 108. Every time when desiring to write data to the smartcard chip 108, the application 1120 is required to select one of the communication files for transmitting the data. The second rule is associated with how to select a communication file for the current data transmission from all the communication files recorded in the file area 608. In the present exemplary embodiment, the application 1120 attaches a file identification mark corresponding to the selected communication file to one of the sub-data streams. For example, the application 1120 attaches the file identification mark to the last sub-data stream.

After receiving the write command, the memory management circuit 1043 (or the memory controller 104) first confirms a communication file (referred to as a target communication file hereinafter) selected from all the communication files by the application 1120 according to the second rule. Then, the memory management circuit 1043 (or the memory controller 104) examines whether there is one sub-data streams among all the sub-data streams contained in the data stream to be written having an attached file identification mark corresponding to the target communication file. If yes, the memory management circuit 1043 (or the memory controller 104) then reorders the sub-data streams according to the first rule and the data index mark of each sub-data stream.

Namely, the memory management circuit 1043 (or the memory controller 104) performs reordering the sub-data streams only when the communication file selected for the current data writing operation complies with the second rule that is pre-agreed by the host system 1000 (or the application 1120 installed in the host system 1000) with the memory storage apparatus 100 and then, transmits the reordered sub-data streams to the smartcard chip 108. As such, the possibility of being interfered may be reduced even though the malicious application sends maliciously interfering data or the malicious application desires to scramble the sequence of the sub-data streams by randomly accessing the communication files when the application 1120 is ready for performing the data writing operation since the malicious application lacks of information in connection with the second rule and it is less possible for the malicious application to select the same communication file as the application 1120. When desiring to write data to the smartcard chip 108 in the next time, the application 1120 selects another communication file according to the second rule, while the memory management circuit 1043 (or the memory controller 104) continues to confirm whether the received write data stream is transmitted from the application 1120 by the aforementioned method so as to reduce the possibility of being interfered by the malicious application.

Figures 9A, 9B:
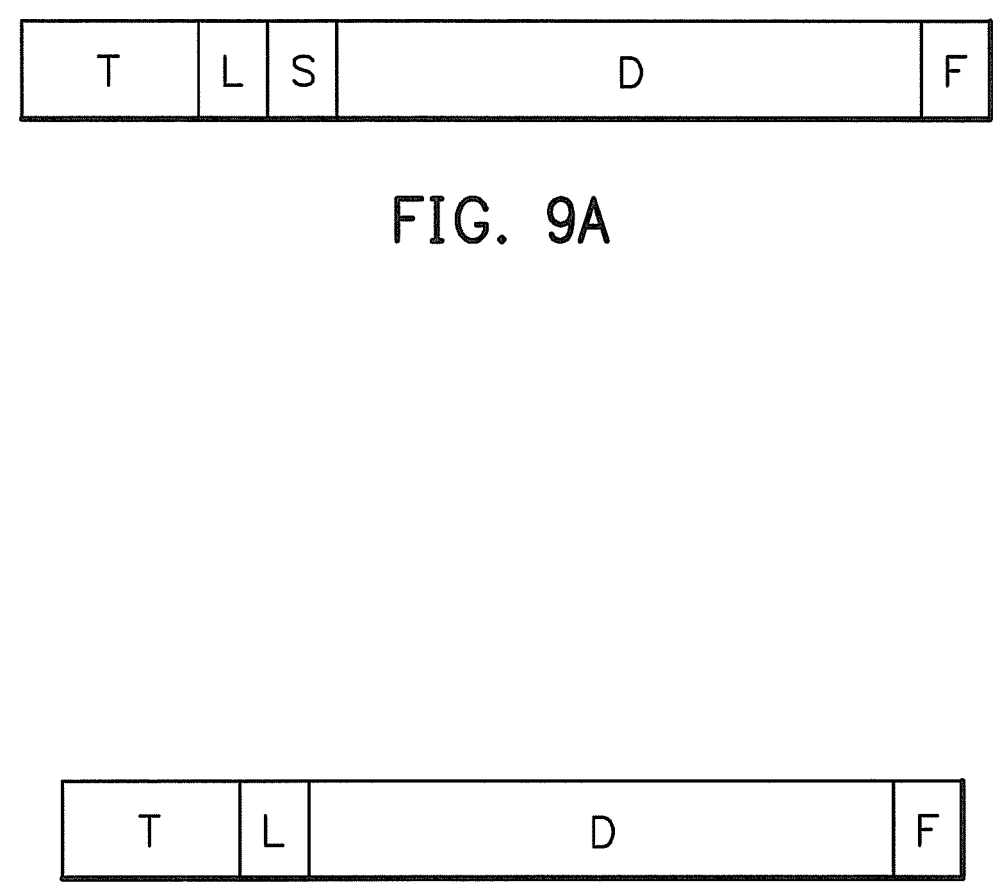

FIG. 9A is a schematic diagram illustrating a write command issued to the smartcard chip 108 by the memory management circuit 1043 (or the memory controller 104) according to an exemplary embodiment of the invention. Referring to FIG. 9A, a column T is used for recording a special mark. A column L is used for recording a length of a data stream to be written. A column S is used for recording information in connection with data security, such as the data index mark and the predetermined function of the first sub-data stream. A column D is used for recording the data content (i.e. the reordered sub-data streams) to be written. A column F is used for recording a file identification mark of a communication file selected by the application 1120 for the data writing operation to be performed this time.

After transmitting the reordered sub-data streams to the smartcard chip 108 by using the write command, as shown in FIG. 9A, the memory management circuit 1043 (or the memory controller 104) transmits a response message to the host system 1000 according to an operation result from the smartcard chip 108 and the communication file confirmed by the second rule. The response message is shown in FIG. 9B, wherein the column T is used for recording a special mark. The column L is used for recording the length of the previously written data stream. The column D is used for recording the content of the response message generated by the smartcard chip 108 according to the content of the previously written data stream. The column F is used for recording the file identification mark of the communication file selected by the application 1120 for the data writing operation that is performed this time.

Figure 10:
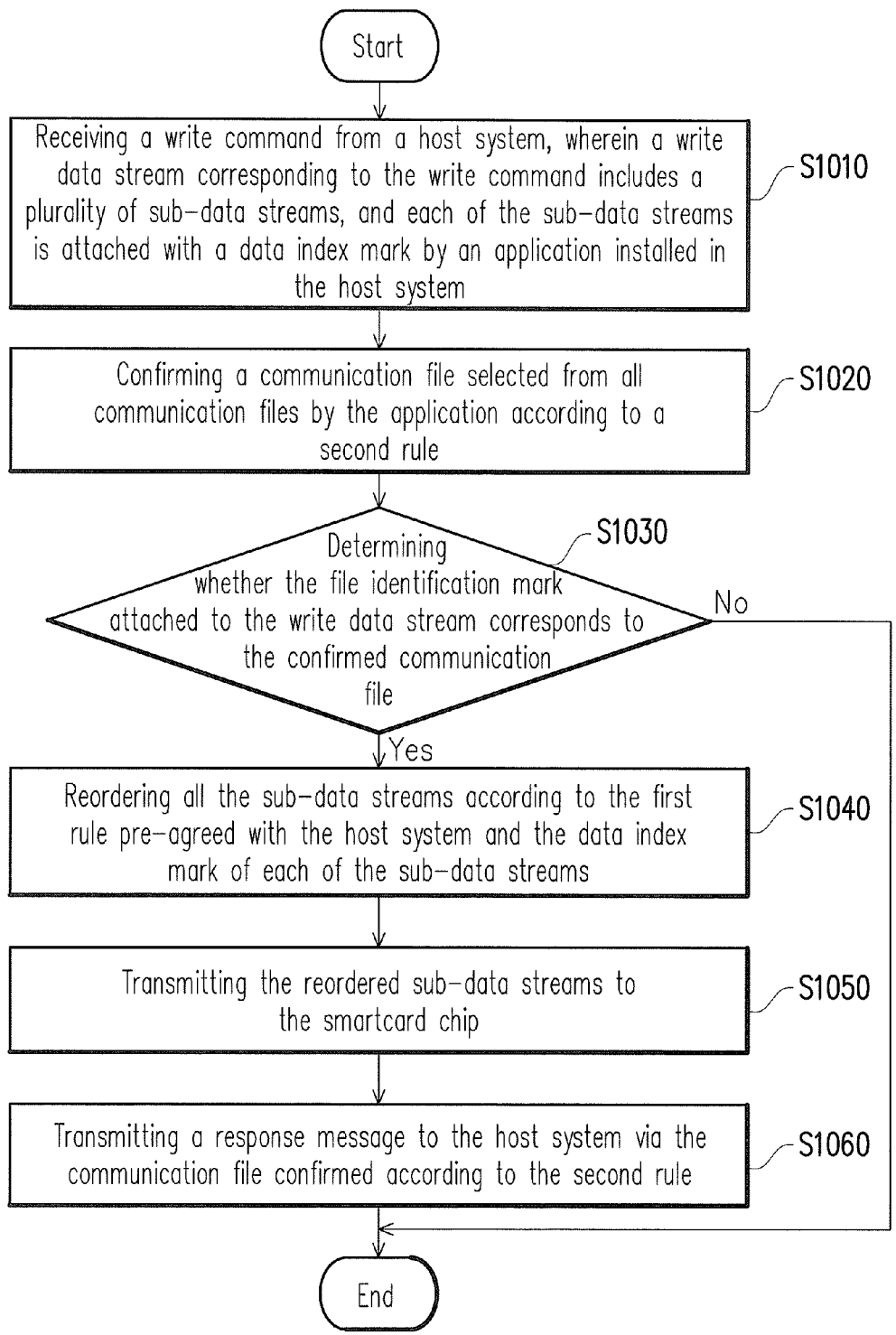
FIG. 10 is a flowchart illustrating a data processing method according to an exemplary embodiment of the invention.

FIG. 10 is a flowchart illustrating a data processing method according to an exemplary embodiment of the invention.

Referring to FIG. 10, in step S1010, the memory management circuit 1043 (or the memory controller 104) receives a write command from a host system 1000. A write data stream corresponding to the write command includes a plurality of sub-data streams, and each of the sub-data stream is attached with a data index mark by an application 1120 installed in the host system 1000. The write data stream corresponds to an original data stream to be transmitted to a memory storage apparatus 100 by the application 1120. A first rule is pre-agreed by the memory storage apparatus 100 with the application 1120. The first rule includes a predetermined function, an initial parameter selecting manner and a parameter increasing manner. The application 1120 selects an initial parameter according to the initial parameter selecting manner and substitutes the initial parameter into the predetermined function to obtain a data index mark attached to a first sub-data stream in the original data stream and determines data index marks to be attached to the other sub-data streams individually according to the parameter increasing manner, the data index mark of the first sub-data stream and a sequence of the sub-data streams in the original data stream.

Then, in step S1020, the memory management circuit 1043 (or the memory controller 104) confirms a communication file selected by the application 1120 from all communication files recorded in the file area 608 according to a second rule pre-agreed with the host system 1000 (or the application 1120 installed in the host system 1000).

In step S1030, the memory management circuit 1043 (or the memory controller 104) determines whether a file identification mark attached to the write data stream corresponds to the confirmed communication file.

If not, the process of the data processing method illustrated in the present exemplary embodiment is ended. If yes, in step S1040, the memory management circuit 1043 (or the memory controller 104) reorders all the sub-data streams according to the first rule pre-agreed with the host system 1000 and the data index mark of each of the sub-data streams.

In step S1050, the memory management circuit 1043 (or the memory controller 104) transmits the reordered sub-data streams to the smartcard chip 108.

Finally, in step S1060, the memory management circuit 1043 (or the memory controller 104) transmits a response message to the host system 1000 according to the communication file confirmed by the second rule.

Based on the above, the accuracy of data writing operation performed on the smartcard chip can be ensured by the data processing method, the memory controller and the memory storage apparatus of the invention and the possibility of being interfered by the malicious application during the data writing operation can be reduced. The previously described exemplary embodiments of the invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of data processing, for a memory storage apparatus having a rewritable non-volatile memory module and a smartcard chip, wherein the rewritable non-volatile memory module comprises a plurality of physical erase units, and each of the physical erase units comprises a plurality of physical program units, the method comprising:
   receiving a write command from a host system, wherein a write data stream corresponding to the write command comprises a plurality of sub-data streams, and each of the sub-data stream is attached with a data index mark by an application installed in the host system, wherein the write data stream corresponds to an original data stream to be transmitted to the memory storage apparatus by the application, and a first rule is pre-agreed by the memory storage apparatus with the application, wherein the first rule comprises a predetermined function, an initial parameter selecting manner and a parameter adjusting manner, and the application selects an initial parameter according to the initial parameter selecting manner, substitutes the initial parameter into the predetermined function so as to obtain the data index mark attached to a first sub-data stream in the original data stream, and the application further selects initial parameters corresponding to each of the other sub-data streams of the plurality of sub-data streams according to the parameter adjusting manner, the data index mark of the first sub-data stream and a sequence of the sub-data streams in the original data stream, and determines the corresponding data index mark individually attached to each of the other sub-data streams of the plurality of sub-data streams by substituting the initial parameters of each of corresponding other sub-data streams into the predetermined function, wherein the parameter adjusting manner is associated with incrementing regularity or decrementing regularity between the initial parameters of each of the other sub-data streams of the plurality of sub-data streams of the original data stream;
   reordering a sequence of the sub-data streams to comply with a sequence of the original data stream according to the first rule pre-agreed with the application and the data index mark of each of the sub-data streams; and
   transmitting the reordered sub-data streams to the smartcard chip.

2. The method according to claim 1, wherein an operation system is installed in the host system, the application transmits the original data stream to the memory storage apparatus via the operation system and divides the original data stream into the plurality of sub-data streams according to a capacity of a basic access unit, and a sequence of the sub-data streams in the write data stream is identical to or different from the sequence of sub-data streams in the original data stream.

3. The method according to claim 1, wherein the step of reordering the sub-data streams according to the first rule pre-agreed with the application and the data index mark of each of the sub-data streams comprises:
   confirming the initial parameter selected by the application according to the initial parameter selecting manner;
   substituting the initial parameter into the predetermined function so as to obtain a function value; and
   reordering the sub-data streams to comply with the original data stream according to the function value, the parameter adjusting manner and the data index mark of each of the sub-data streams.

4. The method according to claim 1, wherein a plurality of logical erase units are configured for mapping to a portion of the physical erase units, the plurality of logical erase units is at least formatted to a file allocation table (FAT) area, a root directory area and a file area, a plurality of communication files are stored in the file area, and the application selects one of the communication files according to a second rule pre-agreed by the memory storage apparatus with the application and attaches a file identification mark corresponding to the selected communication file to one of the sub-data streams.

5. The method according to claim 4, wherein after the step of receiving the write command from the host system, the method further comprises:
   confirming the communication file selected from the communication files by the application according to the second rule; and
   performing the step of reordering the sub-data streams according to the first rule pre-agreed with the application and the data index mark of each of the sub-data streams only when the file identification mark attached to the one of the sub-data stream corresponds to the confirmed communication file.

6. The method according to claim 5, wherein after the step of transmitting the reordered sub-data streams to the smartcard chip, the method further comprises:
   transmitting a response message to the host system via the communication file confirmed according to the second rule, wherein the response message comprises the file identification mark corresponding to the confirmed communication file.

7. A memory controller, configured in a memory storage apparatus having a rewritable non-volatile memory module and a smartcard chip, the memory controller comprising:
   a host interface, configured to couple to a host system;
   a memory interface, configured to couple to the rewritable non-volatile memory module, wherein the rewritable non-volatile memory module has a plurality of physical erase units, and each of the physical erase units has a plurality of physical program units; and
   a memory management circuit, coupled to the host interface and the memory interface and receive a write command from the host system,
   wherein a write data stream corresponding to the write command comprises a plurality of sub-data streams, and each of the sub-data streams is attached with a data index mark by an application installed in the host system,
   wherein the write data stream corresponds to an original data stream to be transmitted to the memory storage apparatus by the application, and a first rule is pre-agreed by the memory storage apparatus with the application, wherein the first rule comprises a predetermined function, an initial parameter selecting manner and a parameter adjusting manner, wherein the application selects an initial parameter according to the initial parameter selecting manner, substitutes the initial parameter into the predetermined function so as to obtain the data index mark attached to a first sub-data stream in the original data stream, and the application further selects initial parameters corresponding to each of the other sub-data streams of the plurality of sub-data streams according to the parameter adjusting manner, the data index mark of the first sub-data stream and a sequence of the sub-data streams in the original data stream, and determines the corresponding data index mark individually attached to each of the other sub-data streams of the plurality of sub-data streams by substituting the initial parameters of each of corresponding other sub-data streams into the predetermined function, wherein the parameter adjusting manner is associated with incrementing regularity or decrementing regularity between the initial parameters of each of the other sub-data streams of the plurality of sub-data streams of the original data stream, wherein the memory management circuit is further configured to reorder a sequence of the sub-data streams to comply with a sequence of the original data stream according to the first rule pre-agreed with the application and the data index mark of each of the sub-data streams, and wherein the memory management circuit is further configured to transmit the reordered sub-data streams to the smartcard chip.

8. The memory controller according to claim 7, wherein an operation system is installed in the host system, the application transmits the original data stream to the memory storage apparatus via the operation system and divides the original data stream into the plurality of sub-data streams according to a capacity of a basic access unit, and a sequence of the sub-data streams in the write data stream is identical to or different from the sequence of sub-data streams in the original data stream.

9. The memory controller according to claim 7, wherein when reordering the sub-data streams according to the first rule pre-agreed with the application and the data index mark of each of the sub-data streams, the memory management circuit confirms the initial parameter selected by the application according to the initial parameter selecting manner, substitutes the initial parameter into the predetermined function so as to obtain a function value and reorders the sub-data streams to comply with the original data stream according to the function value, the parameter adjusting manner and the data index mark of each of the sub-data streams.

10. The memory controller according to claim 7, wherein the memory management circuit configures a plurality of logical erase units for mapping to a portion of the physical erase units, formats the plurality of logical erase units to a file allocation table (FAT) area, a root directory area and a file area and stores a plurality of communication files in the file area, wherein the application selects one of the communication files according to a second rule pre-agreed by the memory storage apparatus with the application and attaches a file identification mark corresponding to the selected communication file to one of the sub-data streams.

11. The memory controller according to claim 10, wherein the memory management circuit is further configured to confirm the communication file selected from the communication files by the application according to the second rule after the write command from the host system is received and reorder the sub-data streams according to the first rule pre-agreed with the application and the data index mark of each of the sub-data streams only when the file identification mark attached to the one of the sub-data stream corresponds to the confirmed communication file.

12. The memory controller according to claim 11, wherein after the reordered sub-data streams are transmitted to the smartcard chip, the memory management circuit is further configured to transmit a response message to the host system via the communication file confirmed according to the second rule, wherein the response message comprises the file identification mark corresponding to the confirmed communication file.

13. A memory storage apparatus, comprising:
a connector, configured to couple to a host system;
a rewritable non-volatile memory module, having a plurality of physical erase units, and each of the physical erase units having a plurality of physical program units;
a smartcard chip; and
a memory controller, coupled to the connector, the rewritable non-volatile memory module and the smartcard chip and configured to receive a write command from the host system, wherein a write data stream corresponding to the write command comprises a plurality of sub-data streams, and each of the sub-data streams is attached with a data index mark by an application installed in the host system, wherein the write data stream corresponds to an original data stream to be transmitted to the memory storage apparatus by the application, and a first rule is pre-agreed by the memory storage apparatus with the application, wherein the first rule comprises a predetermined function, an initial parameter selecting manner and a parameter adjusting manner, wherein the application selects an initial parameter according to the initial parameter selecting manner, substitutes the initial parameter into the predetermined function so as to obtain the data index mark attached to a first sub-data stream in the original data stream, and the application further selects initial parameters corresponding to each of the other sub-data streams of the plurality of sub-data streams according to the parameter adjusting manner, the data index mark of the first sub-data stream and a sequence of the sub-data streams in the original data stream, and determines the corresponding data index mark individually attached to each of the other sub-data streams of the plurality of sub-data streams by substituting the initial parameters of each of corresponding other sub-data streams into the predetermined function, wherein the parameter adjusting manner is associated with incrementing regularity or decrementing regularity between the initial parameters of each of the other sub-data streams of the plurality of sub-data streams of the original data stream, wherein the memory controller is further configured to reorder a sequence of the sub-data streams to comply with a sequence of the original data stream according to the first rule pre-agreed with the application, and the data index mark of each of the sub-data streams, and wherein the memory controller is further configured to transmit the reordered sub-data streams to the smartcard chip.

14. The memory storage apparatus according to claim 13, wherein an operation system is installed in the host system, the application transmits the original data stream to the memory storage apparatus via the operation system and divides the original data stream into the plurality of sub-data streams according to a capacity of a basic access unit, and a sequence of the sub-data streams in the write data stream is identical to or different from the sequence of sub-data streams in the original data stream.

15. The memory storage apparatus according to claim 13, wherein when reordering the sub-data streams according to the first rule pre-agreed with the application and the data index mark of each of the sub-data streams, the memory controller confirms the initial parameter selected by the application according to the initial parameter selecting manner, substitutes the initial parameter into the predetermined function so as to obtain a function value and reorders the sub-data streams to comply with the original data stream according to the function value, the parameter adjusting manner and the data index mark of each of the sub-data streams.

16. The memory storage apparatus according to claim 13, wherein the memory controller configures a plurality of logical erase units for mapping to a portion of the physical erase units, formats the plurality of logical erase units to a file allocation table (FAT) area, a root directory area and a file area and stores a plurality of communication files in the file area,
wherein the application selects one of the communication files according to a second rule pre-agreed by the memory storage apparatus with the application and attaches a file identification mark corresponding to the selected communication file to one of the sub-data streams.

17. The memory storage apparatus according to claim 16, wherein the memory controller is further configured to confirm the communication file selected from the communication files by the application according to the second rule after the write command from the host system is received and reorder the sub-data streams according to the first rule pre-agreed with the host system and the data index mark of each of the sub-data streams only when the file identification mark attached to the one of the sub-data stream corresponds to the confirmed communication file.

18. The memory storage apparatus according to claim 17, wherein after the reordered sub-data streams are transmitted to the smartcard chip, the memory controller is further configured to transmit a response message to the host system via the communication file confirmed according to the second rule, wherein the response message comprises the file identification mark corresponding to the confirmed communication file.

* * * * *